E. THOMSON.
POWER TRANSMITTING MECHANISM.
APPLICATION FILED MAY 1, 1908.
1,095,132.
Patented Apr. 28, 1914.
2 SHEETS—SHEET 1.
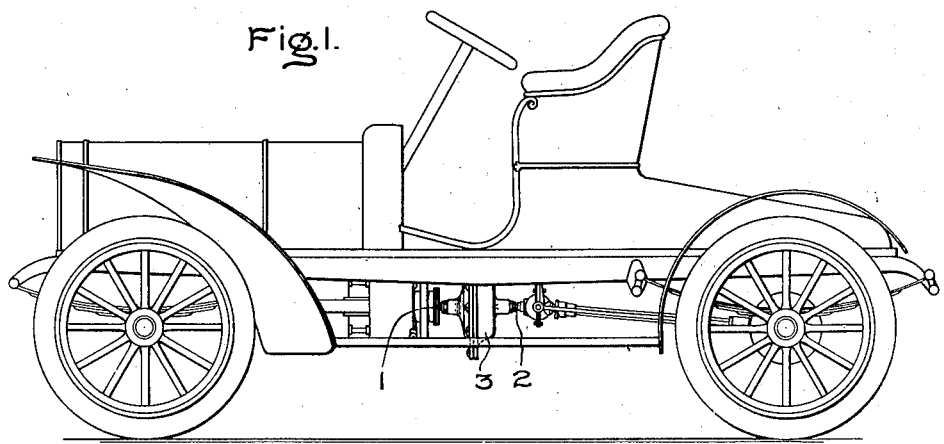
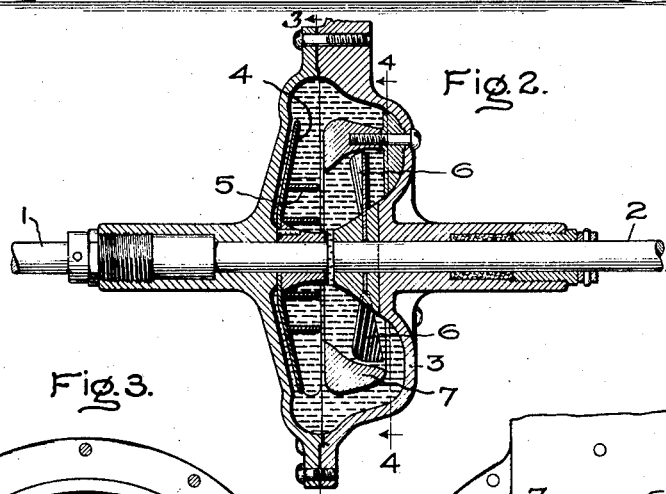
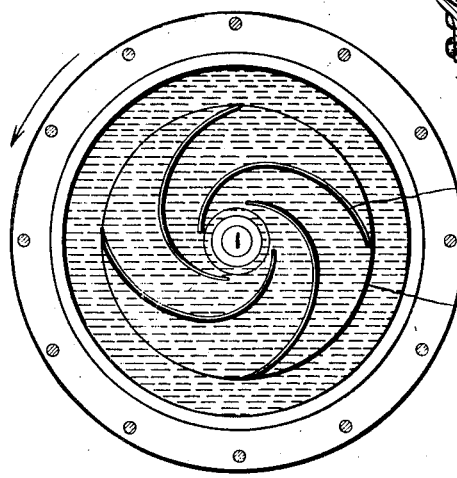
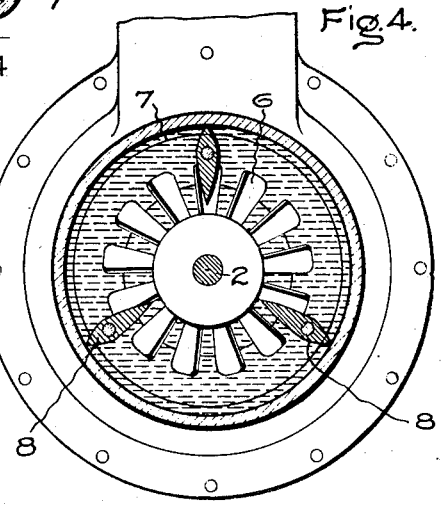
Witnesses:
Marcus L. Byng.
J. Ellis Glen.
Inventor,
Elihu Thomson,
By Albert G. Davis,
Atty.

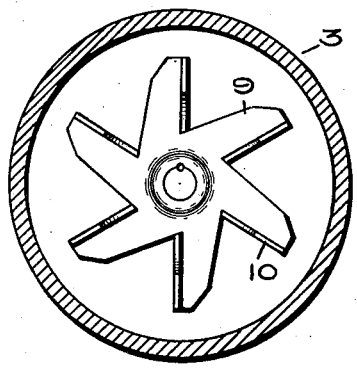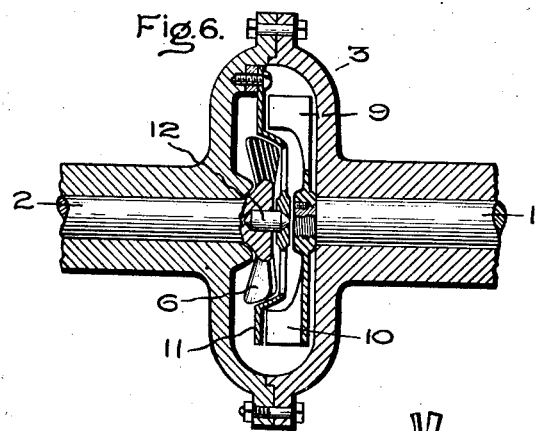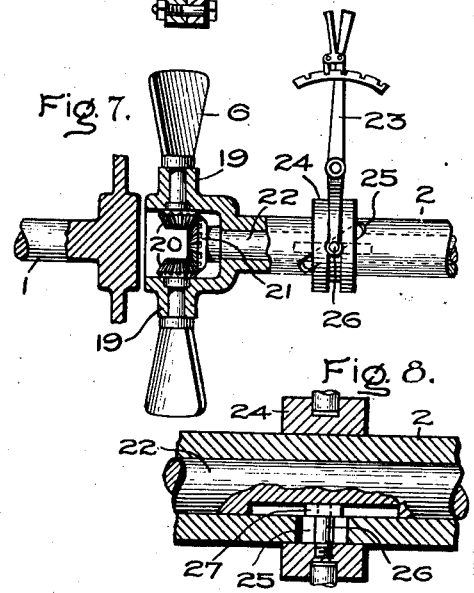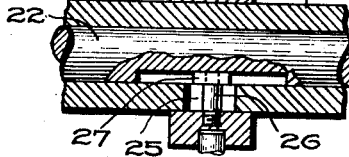

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

POWER-TRANSMITTING MECHANISM.

1,095,132.  Specification of Letters Patent.  Patented Apr. 28, 1914.

Application filed May 1, 1908. Serial No. 430,287.

*To all whom it may concern:*

Be it known that I, ELIHU THOMSON, a citizen of the United States, residing at Swampscott, in the county of Essex, State of Massachusetts, have invented certain new and useful Improvements in Power-Transmitting Mechanism, of which the following is a specification.

My invention relates to power-transmitting mechanism, particularly of the type in which the speed and torque of a driven shaft are varied, and its object is to provide a simple and reliable means by which the torque exerted on a driven shaft by a constantly running driving shaft may be easily varied from practically zero to a maximum and will automatically increase as the difference of speed between the two shafts increases due either to an increase in load on the driven shaft or to an increase in the speed of the driving shaft.

In carrying out my invention the driving and driven shafts are connected through a device which exerts upon the driven shaft a torque dependent on and automatically varying with the difference in speed between the two shafts. In the preferred form of mechanism the driving shaft develops a pressure dependent on its speed on some fluid, preferably mercury, which transmits the pressure to the driven shaft by flowing through motor mechanism arranged to rotate the driven shaft and to offer an increased resistance to the flow of the fluid as the difference of speed between the two shafts increases, thereby causing the torque exerted on the driven shaft to increase automatically as the speed of the driven shaft falls below that of the driving shaft, due either to an increase of load on the driven shaft or to an increase in speed of the driving shaft. The pressure is exerted on the fluid by some suitable pump or similar device connected to the driving shaft and proportioned to put the fluid under a pressure dependent on the speed of the shaft, and which is preferably, though not necessarily, in the form of a turbine wheel or the impeller of a centrifugal pump immersed in the fluid and arranged to put the fluid in motion through channels which permit the fluid to circulate from the outlet of the pump back to the intake. A fluid motor connected to the driven shaft to rotate it forms part of the channels through which the fluid must circulate, and the various parts are so shaped that the motor, which is preferably some variety of turbine or a screw propeller with its vanes arranged in the line of flow of the fluid, is subjected to an increased pressure on the vanes as the difference of speed between the impeller and the motor increases, since the vanes obstruct the channels and the fluid must drive them out of the way to get through the channels. The fluid used is preferably one which has great density and practically uniform viscosity under varying temperatures, and which will not adhere to the containing vessel so that difficulties resulting from leakage through small openings are avoided. Mercury is the fluid which best answers these requirements, and only a small amount is required to transmit the amount of power required for automobiles and similar devices. The turbine wheels used for the impeller and motor may be of any suitable type, either radial or axial flow, and in some cases it may be desirable, by changing the inclination of the vanes to vary the relative speeds of the impeller and motor, and in the same or in any other suitable way to vary the relative direction of movement of the impeller and motor and thereby provide a means for reversing the driven shaft where the driving shaft always runs in the same direction.

My invention will best be understood in connection with the accompanying drawings, which are merely illustrative of some of the forms in which the invention may be embodied, and in which—

Figure 1 shows an automobile with one form of my invention embodied in the transmission mechanism; Fig. 2 is a longitudinal sectional view of the transmission mechanism shown in Fig. 1; Fig. 3 is a cross-section along the line 3—3 of the mechanism shown in Fig. 2; Fig. 4 is a cross-section along the line 4—4 of Fig. 2; Fig. 5 is a cross-section showing a modified form of impeller; Fig. 6 is a longitudinal section of one form of mechanism in which the impeller shown in Fig. 5 is used; Fig. 7 is a view, partly in section, of a form of reversible impeller for varying the direction of rotation of the driven shaft and Fig. 8 is a detail view partly in section of a sleeve slidably mounted on a shaft to control the position of the blades of the impeller shown in Fig. 7.

A power-transmitting mechanism embodying my invention provides a simple and easy way of varying both the speed and torque of a driven shaft and, while of value for driving any kind of machinery in which a variable resistance is required to be overcome, is particularly adapted for a transmission mechanism for automobiles, since upon a decrease in speed of the automobile an increased torque is automatically exerted upon the driving wheels, while by simply increasing the speed of the engine the torque can be very greatly increased for the purpose of overcoming an obstruction.

The drawings show in Fig. 1 an automobile of the conventional type in which the engine under the hood has a driving shaft 1 connected through a power-transmitting mechanism embodying my invention to a driven shaft 2 connected through the usual universal joint to the driving wheels of the automobile. The two shafts 1 and 2, as shown in Fig. 2, are in alinement and both project into a casing 3 filled with some liquid of great density, such as mercury. The power of the driving shaft 1 is transmitted through the liquid by means of a driving member or impeller 4 mounted on the driving shaft inside the casing and provided with spiral ribs 5 so shaped that when the impeller is driven in the direction of the arrow in Fig. 3 the liquid is driven from the center of the impeller toward the periphery both by centrifugal force and by the direct action of the ribs, and is maintained at the periphery under a pressure dependent on the speed of the impeller. The casing 3 is provided with channels which permit the circulation of the fluid, and the power is transmitted to the driven shaft 2 by means of a fluid motor mounted on and securely connected to the driven shaft inside the casing and preferably in the form of a screw propeller provided with vanes or blades 6 so arranged that the flow of liquid, due to the action of the impeller 4 causes the motor to rotate and exert a torque on the driven shaft. In the form of device shown in Fig. 2 the liquid circulates through a channel formed by an annular guide piece 7 held away from the wall of the casing 3 by means of space blocks 8 and shaped to permit the liquid to circulate from the periphery of the impeller 4 over the vanes 6 of the fluid motor and back to the center of the impeller. As the annular rib 7 is between the circular rim or edge of the casing and cylindrical hub on which the vanes 6 are mounted, the channel through which the fluid flows around the rib 7 has an inlet at the periphery of the impeller 4 having an annular section and an outlet having an annular section concentric with the inlet and containing the vanes 6. The fluid delivered by the impeller to the inlet of the channel can flow in a direct and unobstructed manner to the vanes 6 near the outlet of the channel, where the fluid is delivered to the center of the impeller and is again put under pressure by the impeller. By this construction the liquid is circulated, and as the speed of the motor vanes 6 decreases with reference to the speed of the impeller 4, the fluid finds greater difficulty in circulating through the vanes and exerts a greater pressure upon the vanes, thereby causing an increased torque on the driven shaft. With a device constructed as shown in Fig. 2 the torque exerted on the driven shaft increases very rapidly with the difference in speed between the impeller 4 and the motor vanes 6.

The impeller may assume various forms as long as it is constructed to cause a circulation of the liquid in the casing 3, and in the modification shown in Figs. 5 and 6 the impeller 9 mounted on the driving shaft 1 is provided with rotary vanes or blades 10 wider at their outer ends than at the center, as shown in Fig. 6, and arranged to cause a circulation of the fluid from the center to the periphery of the impeller and back through a channel formed by a diaphragm 11, corresponding to the annular guide 7 shown in Fig. 2, to the intake of the impeller over the blades or vanes 6 of the motor mounted on the driven shaft 2 and corresponding both in structure and in function to the motor shown in Fig. 2. The motor is supported or steadied by means of a pivot 12 mounted in the end of the driven shaft 2 and coöperating with a bearing in the diaphragm or guide 11. The operation of this form is substantially the same as the form shown in Fig. 2, and the torque exerted upon the driven shaft varies automatically with the difference of speed between the impeller 5 and the motor 6.

In the various power transmitting mechanisms above described the motor is driven in the same direction as the impeller and the torque varies automatically with the difference in speed between the impeller and the motor. It may be desirable in some cases to vary the effect of the circulating fluid upon the motor and also to reverse the direction of movement of the driven shaft without reversing the driving shaft. This result is preferably accomplished by making adjustments in the mechanism which will arbitrarily vary the torque exerted by the motor, and will also cause the motor to rotate in either direction as desired, although the fluid continues to flow in the same direction. This result is preferably accomplished by making the vanes or blades of the motor element, which are set at an angle to the line of the flow of fluid, adjustable about their axes so that the angle of the vane or blade with the direction of the flow of fluid may be altered and thereby alter the torque exerted upon the driven shaft by the fluid, while a reversal of the inclination of the vanes or blades will reverse the direction of movement of the driven shaft.

Where the motor is made in the form of a screw propeller, the angle of the blades may be changed or reversed by any of the well-known devices used for this purpose in motor-driven boats, and in the specific form shown in Figs. 7 and 8 of the drawings, the driven shaft assumes the form of a tube carrying lugs or bosses 19 in which the blades or vanes 6 of the motor are rotatably mounted. Each of the blades or vanes carries on its inner end a beveled gear 20, which in turn meshes with a gear 21 mounted on an adjusting shaft 22 angularly adjustable with reference to the driven shaft 2. In this construction a change in the angular relation of the adjusting shaft 22 to the driven shaft 2 will cause a corresponding change in the angle made by the vanes 6 with the axis of the driven shaft 2. The angular adjustment of the two shafts may be made in any desired manner, and in the specific form shown the hand lever 23 controls the position of a sliding collar 24 mounted on the driven shaft 2 and movable back and forth over the inclined slot 25 in the shaft. The sliding collar 24 carries a pin 26 which projects through the inclined slot in the driven shaft 2 and carries on the lower end a block 27 slidably mounted in a longitudinal slot or groove in the adjusting shaft 22. As a result of this construction a movement of the sliding collar 24 longitudinally of the driven shaft will cause a relative angular movement of the driven shaft and of the adjusting shaft, thereby altering the inclination of blades 6. This construction may be used either for the impeller or for the motor, but is preferably applied to the motor.

The operation of the device shown in Figs. 1 to 4 is as follows: The power applied to the driving shaft 1 rotates the impeller, thereby causing the fluid in the casing 3 to circulate from the center toward the periphery of the impeller. The spiral vanes 5 are shaped to assist the flow of fluid toward the periphery of the impeller and as a result of centrifugal force and the action of the vanes the pressure maintained on the fluid at the periphery of the impeller is dependent on the speed of the impeller. The fluid is preferably mercury, of which a small amount will transmit a great amount of power, owing to its great density. The mercury circulates through the channels in the casing 3 and through the vanes or blades 6 of the motor, tending to rotate the motor and exerting a torque on the driven shaft 2. At low speeds of the impeller the torque exerted on the driven shaft 2 is very slight, and an automobile can be held stationary by applying the brakes to the rear wheels while the engine is running slowly. The pressure at the periphery of the impeller 4 increases approximately as the square of the speed, and if the motor does not rotate fast enough to permit a free flow of the fluid through the vanes 6 to the intake of the impeller, this pressure is transmitted to the vanes, tending to push them out of the way and exerting on the driven shaft a torque which increases very rapidly with an increase in the difference in speed between the driving and the driven shafts. As a result of this property of the mechanism, the torque exerted on the driving wheels of the automobile can be very greatly increased by increasing the speed of the engine, and on the other hand, if the speed of the engine is maintained constant and the resistance to be overcome by the driving wheels increases, the driven shaft 2 tends to slow down and the torque exerted on it automatically increases. With the parts proportioned as shown in Fig. 2 the transmission mechanism is reversible and power applied to the motor will cause a circulation of the liquid, which in turn will tend to transform the impeller 4 into a motor and cause it to deliver some power to the driving shaft 1, although the mechanism is not as efficient as when running in the normal manner.

The operation of the form shown in Figs. 5 and 6 is substantially the same as that already described, the principal difference being that with the form of impeller shown the pressure at the periphery of the impeller does not increase with the speed as rapidly as in the other form, and as a result the torque exerted on the driven shaft 2 is more uniform throughout wide variations of speed.

My invention may be embodied in many other forms than those shown and described, and I therefore do not restrict the appended claims to those forms, but intend to cover all changes and modifications within the spirit and scope of my invention.

What I claim as new and desire to secure by Letters Patent of the United States, is—

1. In a power transmitting mechanism, the combination of a rotary impelling member shaped to deliver at its periphery fluid under a pressure dependent on the speed of said impelling member, a rotatable motor member shaped to permit fluid to flow through it and thereby exert a torque on said motor member, and a stationary casing shaped to completely inclose both said members and to provide an equally direct and unobstructed discharge passage from every point on the periphery of said impelling member to corresponding points on said motor member, said casing being filled with a fluid in which both said members are completely submerged.

2. A power transmitting mechanism comprising, a rotatable impelling member shaped to deliver at its periphery fluid under pressure dependent on the speed of said impelling member, a rotatable motor member mounted parallel to said impelling member and shaped to be driven by the fluid circulated by said impelling member, and a casing completely inclosing both said members filled with fluid in which both said members are submerged, said casing being shaped to direct through said motor member along the axis of rotation thereof a fluid discharged from said impelling member, said impelling member being mounted concentric with said casing to provide equal clearance between the casing and the impelling member at all points on the periphery of said impelling member.

3. In a power transmitting mechanism, the combination of a rotatable impeller for putting fluid under a pressure dependent on the speed of said impeller, a rotatable motor member having vanes set at an angle to its axis of rotation and to the flow of fluid, means for at will varying the angle of said vanes, and a stationary casing which encircles said impeller and said motor member and provides a discharge passage of substantially the same size at all points on the periphery of said impeller, said discharge passage leading through the vanes of said motor member along the axis of rotation thereof and permitting a direct and unobstructed flow of fluid from every point of the periphery of said impeller to the vanes of said motor member.

4. In a power transmitting mechanism, the combination of a casing containing fluid and having two coaxial annular chambers communicating at their ends to form a continuous passage for the fluid, a rotatable motor member mounted to rotate about an axis coaxial with said chambers and having vanes which project into one of said chambers at an angle to the flow of fluid therein, and an impeller for delivering fluid at the same pressure to all parts of the chamber into which said vanes project.

5. In a power transmitting mechanism, the combination of a stationary casing containing fluid and having two coaxial annular chambers communicating at their ends to form a continuous passage for the fluid, a rotatable impeller mounted in said casing coaxially with one of said chambers to deliver fluid from all points on its periphery to all points of said chamber at the same pressure, a rotatable motor member mounted coaxially with said other chamber and having vanes which project into said chamber to be acted upon by the fluid flowing therein, and means for at will varying the effect of the fluid flowing in said chamber on said motor member and thereby varying the torque of said motor member.

6. In a power transmitting mechanism, the combination of a rotatable impeller, a casing for said impeller which is filled with fluid and is shaped to provide a passage having an annular section which forms an equally direct and unobstructed exit for the fluid from every point of the periphery of said impeller, said passage leading the fluid through a predetermined path to the inlet of said impeller, and a rotatable motor member having vanes which project into the path of the fluid set in motion by the impeller and are set at an angle to the flow of fluid.

7. In a power transmitting mechanism, the combination with a stationary casing containing fluid, of coöperating members mounted in said casing to rotate about the same axis, said casing being shaped to provide an equally direct and unobstructed discharge passage from every point on the periphery of one member to corresponding points on the other member and to cause the fluid to circulate through said members in the direction of said axis and thereby transmit power from one member to the other by converting the velocity of said fluid into torque, one of said members being provided with adjustable vanes inclined in the direction of flow of fluid, and means for adjusting the inclination of said vanes to vary the effect of said fluid on one of said members.

8. In a power transmitting mechanism, the combination with a stationary casing containing fluid and shaped to provide a passageway with an annular inlet, of coöperating members mounted in said casing to rotate about the same axis, one of said members having passages running in a direction having a radial component and delivering fluid to all points of the annular inlet of said passageway through which the fluid circulates through said members in the direction of said axis, the other of said members being provided with vanes coöperating with said fluid to exert a torque dependent on the velocity of said fluid and thereby transmit power from one member to the other, and means for changing the inclination of said vanes to vary the relative direction of movement of said members.

9. A power transmitting mechanism comprising a disk shaped rotary impeller provided with spiral vanes on its surface to force fluid from the intake toward the periphery of the impeller, a motor provided with adjustable vanes, a stationary casing for completely inclosing said impeller and said motor shaped to provide an equally direct and unobstructed passage from every point on the periphery of the impeller leading through the vanes of the motor to the intake of the impeller, and means for adjusting the vanes of the motor to vary the torque developed.

10. A power transmitting mechanism comprising a rotary impeller having passages for forcing fluid from the intake toward the periphery of the impeller, a casing for said impeller provided with a passage having an annular inlet which surrounds the periphery of the impeller, said passage leading to the intake of the impeller, and a motor with vanes set transverse to and at an angle with its axis of rotation mounted in said casing with said vanes in said passage.

11. The combination with a centrifugally acting rotatable driving member provided with passages running in a direction which has a radial component, of a rotatable driven member having working surfaces exposed to the liquid, a casing which incloses said members and provides a direct discharge passage from every point on the periphery of one member to corresponding points on the other member, a liquid in said casing for imparting the rotation of said driving member to said driven member, and means adapted to vary the relation between the working surfaces of said member and said liquid and thereby vary the speed of said driven member.

In witness whereof, I have hereunto set my hand this 29th day of April, 1908.

ELIHU THOMSON.

Witnesses:
JOHN A. McMANUS, Jr.,
HENRY O. WESTENDARP.